Feb. 3, 1925.
G. A. LYON
1,524,987
VEHICLE BUFFER
Filed May 19, 1923
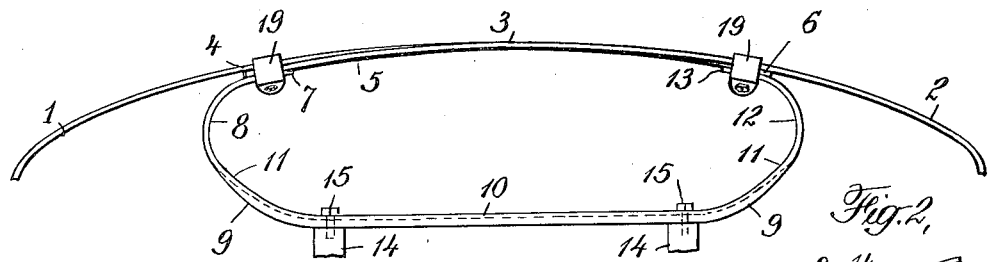
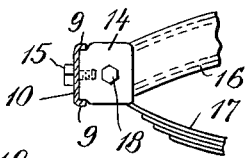
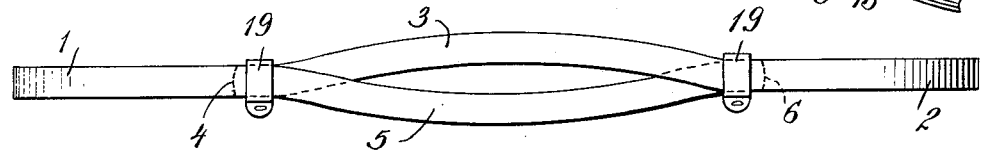
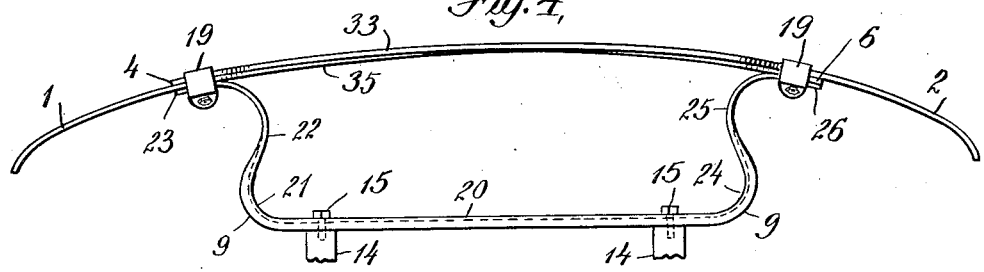
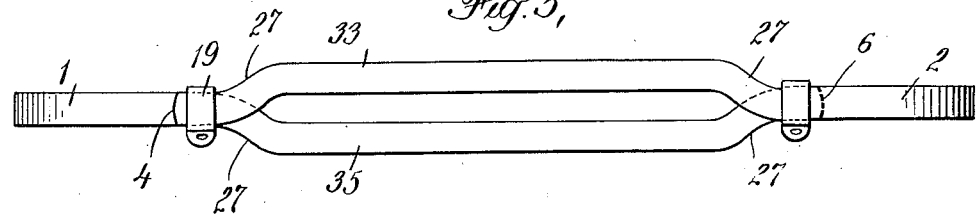
Inventor
George Albert Lyon
By his Attorney
Harry L. Duncan Patented Feb. 3, 1925.

1,524,987

UNITED STATES PATENT OFFICE.

GEORGE ALBERT LYON, OF PHILADELPHIA, PENNSYLVANIA.

VEHICLE BUFFER.

Application filed May 19, 1923. Serial No. 640,091.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Vehicle Buffers, of which the following is a specification, taken in connection with the accompanying drawing, which forms part of the same.

This invention relates especially to resilient buffers for automobiles or other vehicles with which may be combined laterally extending supporting members or brace bars which may be secured or connected across the two frame members of the automobile, to reenforce them and also support the buffer therefrom. The buffer front which may advantageously be used with this type of supporting member may be formed of connected spring steel strip, the front members being, if desired, adjustably connected together and having laterally projecting free ends extending to and ending at the lateral ends of the buffer, as covered by the Lyon Patent 1,247,300 of November 20, 1917.

In the accompanying drawing showing in a somewhat diagrammatic way various illustrative embodiments of this invention:

Fig. 1 is a top view showing an illustrative buffer construction.

Fig. 2 is an enlarged side view showing the attachment which may be used therefor.

Fig. 3 is a front view of the buffer front construction.

Fig. 4 is a top view of another illustrative buffer, and

Fig. 5 shows the buffer front which may be used thereon.

In the illustrative construction shown in Fig. 1 the supporting member may advantageously be formed of a channel sectioned spring steel strip 10 having its flanges 9 extending rearwardly so as to stiffen and strengthen this part of the buffer and also assist in aligning the same when it is bolted or otherwise secured to a built in or otherwise connected frame end 14 shown in Fig. 2, as securely connected to the usual channel frame member 16 of the automobile to which the spring 17 is secured by the spring bolt 18. This frame end may have a substantially vertical contact face and one or more aligning portions adapted to engage one or both of the flanges 9 of this brace bar member 10 which may be securely connected across these frame ends as by bolts 15 threaded into the same. This brace bar portion may be outwardly and forwardly extended so as to provide curved resilient portions such as 8, 12 which may be made more yielding by being formed without the stiffening flanges 9 which may die out at about the points 11, if desired. Inturned connecting ends such as 7, 13 may be formed on these curved portions 8, 12 so as to engage and be clamped or secured to the buffer front of any suitable construction. Spring strip buffer elements such as shown in Figs. 3 and 5 may be used in this connection and may be formed of a number of connected strips of wide thin spring steel which and, like the supporting member, may be hardened and tempered, if desired. As shown in Fig. 3, one of these front strips which may be forwardly arched or curved, if desired, may have a free end 1 extending out to and ending at the lateral end of the buffer front where it may extend out into protective position in front of the automobile wheels. The other cooperating strip member may have a similar free end 2 on the other side of the buffer front. The inner portions of these front strips may, if desired, be oppositely bent or displaced to form vertically widened central impact portions of the buffer front and for this purpose the central portions 3, 5 of these front strips may be oppositely arched or curved to form vertically separated central front impact portions which may have a lenticular opening two or three inches or more wide adjacent their edges. In this way it is possible to have several inches of lateral adjustment between these front strips which may have end connecting portions 4, 6 overlapping the other front strip or element at about the point where the connecting ends of the supporting member are located so that, if desired, all of these parts may be securely connected by enclosing clips or clamping devices such as 19. These overlapping end connecting portions 4, 6 may be arranged one in front and the other behind the cooperating front member or, if desired, both of these connecting ends may be arranged in front of or preferably behind the other front strips as indicated in Figs. 1 and 3 by slightly twisting the oppositely bent central portions which gives a pleasing design and a construction which is somewhat more desirable for some purposes.

Another even more desirable form of brace bar supporting member is shown in Fig. 4 as comprising the spring channel rear supporting member or brace bar portion 20 having rearwardly extending flanges 9, if desired, which may gradually die out at suitable points in the outwardly and forwardly extending ends of this supporting member which may be reversely bent to resiliently support the connecting ends such as 23, 26. Such reversely curved portions as 21, 22, 24, 25 may be formed in these supporting members for this purpose as by bending them while hot around suitable forms after which the strip may be oil quenched while still highly heated and tempered where the greater resilient strength of tempered spring steel is desired. Any suitable buffer front members may be clamped or secured to these connecting ends or front connecting portions 23, 26 and steel strip front members which may be of about the same width as these front connecting portions may be adjustably connected thereto as by suitable clamping members 19. The type of buffer front shown in Fig. 5 may for instance be used in this connection, the unusually long double height central contact portion being desirable for some purposes. These front strips having free ends 1, 2 forming the lateral ends of the buffer front may be bent or curved at 27 so as to form the vertically separated substantially parallel central contact portions 33, 35 which may have their adjacent edges two to four inches apart more or less, the end connecting portions 4, 6 of these strips being preferably brought into overlapping alignment with the outwardly projecting end portions of the other strip or front member so as to be securely connected thereto in a vertically rigid manner and thus give the desired strength under collision conditions and minimize undesirable noise under ordinary running conditions of the automobile.

This invention has been described in connection with a number of embodiments, forms, proportions, sizes, parts, arrangements, materials, methods of construction, connection and use, to the details of which disclosure the invention is not of course to be limited, since what is claimed as new and what is desired to be secured by Letters Patent is set forth in the appended claims.

1. The automobile buffer comprising a rear transversely extending buffer supporting member of channel sectioned steel strip having its side flanges projecting rearwardly and adapted to extend between the frame ends of the automobile and be securely connected thereto and having reversely bent outwardly and forwardly projecting flat sectioned resilient ends to form outwardly projecting front connecting portions, and a cooperating buffer front formed of a pair of connected front members of thin wide spring steel strip and comprising outwardly extending free ends extending to and ending at the lateral ends of the buffer and comprising vertically separated central contact portions.

2. The automobile buffer comprising a rear transversely extending buffer supporting member of channel sectioned steel strip adapted to extend between the frame ends of the automobile and be securely connected thereto and having reversely bent forwardly projecting flat sectioned resilient ends to form outwardly projecting front connecting portions, and a cooperating buffer front formed of connected front members of thin wide spring steel strip and comprising outwardly extending free ends extending to and ending at the lateral ends of the buffer and comprising vertically wide central contact portions.

3. The automobile buffer comprising a rear transversely extending buffer supporting member of angular sectioned steel strip adapted to extend between the frame ends of the automobile and be securely connected thereto and having reversely bent outwardly and forwardly projecting resilient front connecting portions, and a cooperating buffer front formed of a pair of front members of thin wide spring steel strip and comprising outwardly extending free ends extending to and ending at the lateral ends of the buffer and comprising vertically separated substantially parallel central contact portions and end connecting portions overlapping the other front strip respectively and clamping members connecting said overlapping connecting portions in laterally adjusted position to the front connecting portions of said supporting member.

4. The automobile buffer comprising a rear transversely extending buffer supporting member of angular sectioned steel strip adapted to extend between the frame ends of the automobile and be securely connected thereto and having reversely bent outwardly and forwardly projecting resilient front connecting portions, and a cooperating buffer front formed of front members of thin wide spring steel strip and comprising outwardly extending free ends extending to and ending at the lateral ends of the buffer and comprising vertically separated central contact portions and end connecting portions overlapping the other front strip respectively and clamping members connecting said overlapping connecting portions to the front connecting portions of said supporting member.

5. The automobile buffer comprising a rear transversely extending buffer supporting member of channel sectioned steel strip adapted to extend between the frame members of the automobile and be securely connected thereto and having bent outwardly and forwardly projecting resilient ends to form outwardly projecting front connecting portions, and a cooperating buffer front formed of two connected front members of thin wide steel strip and comprising outwardly extending free ends extending to and ending at the lateral ends of the buffer and comprising vertically separated oppositely bent substantially parallel central contact portions.

6. The automobile buffer comprising a rear transversely extending buffer supporting member adapted to extend between the frame members of the automobile and be securely connected thereto and having bent outwardly projecting front connecting portions, and a cooperating buffer front formed of two connected front members of thin wide steel strip and comprising outwardly extending free ends extending to and ending at the lateral ends of the buffer and comprising vertically separated oppositely bent central contact portions.

7. The automobile buffer comprising a rear transversely extending buffer supporting member of channel sectioned steel strip having its side flanges projecting rearwardly and adapted to extend between the frame ends of the automobile and be securely connected thereto and having reversely bent outwardly and forwardly projecting flattened ends to form outwardly projecting front connecting portions, and a cooperating buffer front formed of a pair of front members of thin wide spring steel strip and comprising free ends extending outward to and ending at the lateral ends of the buffer and comprising vertically separated substantially parallel central contact portions and end connecting portions overlapping the other front strip, and clamping members enclosing and securely connecting each of said overlapping portions to the front connector portion of said supporting member.

8. The automobile buffer comprising a rear transversely extending buffer supporting member of channel sectioned steel strip adapted to extend between the frame ends of the automobile and be securely connected thereto and having reversely bent outwardly and forwardly projecting ends to form outwardly projecting front connecting portions, and a cooperating buffer front formed of a pair of front members of thin wide spring steel strip and comprising free ends extending outward to and ending at the lateral ends of the buffer and comprising vertically separated central contact portions and end connecting portions overlapping the other front strip respectively, and clamping members securely connecting each of said overlapping portions to the front connector portion of said supporting member.

9. The automobile buffer comprising a rear transversely extending buffer supporting member of channel sectioned steel strip adapted to extend between the frame ends of the automobile and be securely connected thereto and having reversely bent outwardly and forwardly projecting ends to form front connecting portions, and a cooperating buffer front formed of a pair of connected front members of wide spring steel strip and comprising free ends extending to and ending at the lateral ends of the buffer.

10. The automobile buffer comprising a rear transversely extending buffer supporting member of steel strip adapted to extend between the frame ends of the automobile and be securely connected thereto and having bent outwardly and forwardly projecting front connecting portions, and a cooperating buffer front formed of connected front members of wide spring steel strip and comprising free ends extending to and ending at the lateral ends of the buffer.

11. The automobile buffer comprising a rear transversely extending buffer supporting member of angular sectioned steel strip having its side flanges projecting rearwardly and adapted to extend between the frame ends of the automobile and be securely connected thereto and having bent outwardly and forwardly projecting ends to form outwardly projecting front connecting portions and a co-operating buffer front formed of connected front members of thin wide spring steel strip and comprising free ends extending outward to and ending at the lateral ends of the buffer and comprising vertically separated substantially parallel central contact portions.

12. The automobile buffer comprising a rear transversely extending buffer supporting member of angular sectioned steel strip adapted to extend between the frame ends of the automobile and be securely connected thereto and having bent forwardly projecting front connecting portions and a cooperating buffer front formed of connected front members of thin wide spring steel strip and comprising free ends extending outward to and ending at the lateral ends of the buffer and comprising vertically separated central contact portions.

GEORGE ALBERT LYON.